United States Patent Office 2,797,244
Patented June 25, 1957

2,797,244

PROCESS FOR THE HYDROGENATION OF META-NITROACETOPHENONE

Samuel W. Tinsley, South Charleston, W. Va., assignor to Union Carbide and Carbon Corporation, a corporation of New York No Drawing. Application October 16, 1953, Serial No. 386,671

10 Claims. (Cl. 260—580)

This invention relates to the hydrogenation of meta-nitroacetophenone and more particularly to a process for the production of meta-aminoacetophenone and meta-aminophenylmethylcarbinol by the catalytic hydrogenation of meta-nitroacetophenone.

Heretofore, two basic processes have been employed in the reduction of meta-nitroacetophenone, namely, chemical reduction and catalytic hydrogenation. Either process may give either meta-aminoacetophenone or meta-aminophenylmethylcarbinol depending upon the conditions used.

The process of this invention is directed to an improvement in the latter method of catalytically hydrogenating meta-nitroacetophenone to produce meta-aminoacetophenone and meta-aminophenylmethylcarbinol.

It has been proposed to hydrogenate meta-nitroacetophenone in the presence of a hydrogenation catalyst at an elevated temperature and to concentrate the filtrate on a steam-cone after the catalyst had been removed. The product was recovered from the filtrate by recrystallization techniques. These recrystallization techniques resulted in large losses of the product, thus making the processes commercially unattractive.

These expensive crystallizations could be circumvented if the products were refined by distillation. The distillation of meta-aminoacetophenone and meta-aminophenylmethylcarbinol prepared from ordinary commercial meta-nitroacetophenone, however, leads to excessive decomposition of both products and extremely low yields. Only meta-nitroacetophenone which has been rigorously purified by repeated recrystallization could be hydrogenated and distilled successfully.

This invention resides in the discovery that crude meta-nitroacetophenone may be used and the products distilled in excellent yields, provided that starting material is washed with an alkali metal carbonate or alkali metal bicarbonate solutions, or mixtures thereof, prior to hydrogenation. Hereafter, the use of the word carbonate is intended to include both the carbonates and bicarbonates. This procedure is much simpler and more economical than the previously used recrystallization of meta-nitroacetophenone, especially on an industrial scale.

The crude meta-nitroacetophenone made by nitration of acetophenone is known to contain small amounts of nitric and sulfuric acids, which might be assumed to be responsible for the difficulties encountered when the crude material is hydrogenated. However, these acids are water-soluble, and can be completely removed by washing with water, but this does not obviate the difficulties; the product can still not be distilled without extensive decomposition. It appears that the carbonate is necessary to remove some other, water-insoluble acid which is present in the crude meta-nitroacetophenone.

Strong alkalis such as sodium and potassium hydroxides cannot be used in place of the alkali carbonates or bicarbonates because they have an undesirable effect on nitroacetophenone, promoting condensation and darkening. In addition, if even traces of such strong bases are left in the nitroacetophenone, they also promote decomposition of the hydrogenation products during distillation.

In the process of this invention, the step of washing the crude meta-nitroacetophenone can be done with either a cold or hot solution of an alkali metal carbonate. It is preferred that the crude meta-nitroacetophenone be washed with a hot solution of an alkali metal carbonate so that the crude meta-nitroacetophenone becomes molten, which is found to insure a complete washing. The washing step can be carried out by pouring a hot solution of an alkali metal carbonate over the crude starting material or by mixing the crude meta-nitroacetophenone with a water solution of an alkali metal carbonate and heating the mixture.

The amount of the alkali metal carbonate solution should be sufficient to give a pH greater than 7 after thorough contact with the nitroacetophenone. The concentration of the alkali metal carbonate solution is not at all critical; any convenient concentration may be used as long as the amount is sufficient.

The alkali metal carbonates which may be advantageously employed in carrying out the process of this invention may be any alkali metal carbonate or alkali metal bicarbonate such as, for example, sodium carbonate, potassium carbonate, sodium bicarbonate and potassium bicarbonate.

The washed meta-nitroacetophenone is preferably charged to the hydrogenation zone dispersed or dissolved in a suitable solvent such as, for example, dioxane, ethyl alcohol, isopropyl alcohol and the like.

The catalyst suitable for use in the hydrogenation reaction may be any common liquid-phase hydrogenation catalyst such as, for example, Raney nickel, platinum oxide, and the like.

The hydrogenation step of the process of this invention is preferably carried out at customary hydrogenation pressures of 150 to 2000 pounds per square inch.

In the production of meta-aminoacetophenone the temperature of the hydrogenation step falls in the range of from about 25° C. to 100° C. Preferably, the temperature should not exceed 70° C. If it is desired to produce meta-aminophenylmethylcarbinol, then the hydrogenation step is carried out at a temperature of 80° C. to 180° C. Preferably the temperature is maintained at 120° C.

The process of the invention comprises washing meta-nitroacetophenone with an alkali metal carbonate solution and introducing the washed meta-nitroacetophenone into a hydrogenation zone and hydrogenating the washed meta-nitroacetophenone to produce meta-aminoacetophenone and meta-aminophenylmethyl carbinol.

The following Examples I and II will serve to illustrate the ill effects obtained when the carbonate wash is neglected:

*Example I*

A hydrogenation bomb was charged with 495 grams of crude meta-nitroacetophenone, 1000 cc. of isopropyl alcohol and 25 grams of Raney nickel. Hydrogen was then introduced into the bomb at a pressure of 2000 pounds per square inch. The temperature was raised to 68° C. and maintained at that temperature until the hydrogen absorption was complete. After the hydrogenation reaction was complete the reaction mixture was removed from the hydrogenation bomb, filtered free of catalyst and solvent-stripped. On attempted vacuum distillation of the residue, extensive self-condensation occurred, water was formed and a good vacuum could not be maintained. None of the meta-aminoacetophenone could be vaporized.

*Example II*

A hydrogenation bomb was charged with 330 grams of crude meta-nitroacetophenone and made up to 1000 cc.

with hot dioxane and 20 grams of Raney nickel. Hydrogen was then introduced at a pressure of 1500 pounds per square inch. The temperature was raised to 120° C. and maintained at that temperature until the hydrogen absorption was complete. After cooling, the reaction mixture was removed from the bomb, filtered free of catalyst and solvent-stripped. The residue, when subjected to distillation at reduced pressure, afforded 148 grams (56 percent yield) of meta-aminophenylmethylcarbinol boiling at 122° C. to 132° C. (3 mm. Hg). The remainder of the material was a polymeric residue.

Examples III through VII will serve to illustrate the beneficial effects of the carbonate wash:

Example III

A flask equipped with a stirrer was charged with 1000 grams of crude meta-nitroacetophenone and 1500 cc. of a 10 percent sodium carbonate solution. The mixture was heated until the meta-nitroacetophenone was completely melted; it was allowed to cool and the meta-nitroacetophenone thus washed was filtered and recovered.

A hydrogenation bomb was charged with 660 grams of the washed meta-nitroacetophenone and made up to 1500 cc. with hot dioxane and 30 grams of Raney nickel. Hydrogen was then introduced into the bomb at a pressure of 2000 pounds per square inch. Hydrogen absorption began at 30° C., the temperature was raised to 70° C. and maintained there until the hydrogen absorption was complete. After cooling, the reaction mixture was removed from the bomb and filtered free of catalyst and the solvent removed. The residue, when subjected to distillation at reduced pressure, afforded 480 grams (89 percent yield) of meta-aminoacetophenone boiling at 118° C. (2 mm. Hg).

Example IV

A flask equipped with a stirrer was charged with 1500 grams of crude meta-nitroacetophenone and 1000 cc. of a 5 percent sodium carbonate solution. The mixture was heated until the meta-nitroacetophenone was completely melted; thereupon the mixture was allowed to cool and the meta-nitroacetophenone, thus washed, was filtered.

A hydrogenation bomb was charged with 660 grams of the washed meta-nitroacetophenone and made up to 1500 cc. with hot dioxane and 30 grams of Raney nickel. Hydrogen was then introduced into the bomb at a pressure of 2000 pounds per square inch. Hydrogenation began at 30° C., and was completed at 70° C. The reaction mixture was removed from the hydrogenation bomb and the catalyst and solvent were removed. The residue, when subjected to distillation at reduced pressure, afforded 483 grams (89.5 percent yield) of meta-aminoacetophenone boiling at 116° C. to 118° C. (2 mm. Hg).

Example V

A flask equipped with a stirrer was charged with 2000 grams of crude meta-nitroacetophenone and 1500 cc. of a 10 percent sodium carbonate solution. The mixture was heated until the meta-nitroacetophenone was completely melted; it was allowed to cool and the meta-nitroacetophenone, thus washed, was filtered and recovered.

A hydrogenation bomb was charged with 660 grams of the washed meta-nitroacetophenone and made up to 1500 cc. with hot dioxane and 40 grams of Raney nickel catalyst. Hydrogen was then introduced into the bomb at pressure of 2000 pounds per square inch. Hydrogen was absorbed slowly at 25° C.; the temperature was raised to 120° C. and kept there until the hydrogen absorption was complete. The reaction mixture was removed from the bomb and the catalyst and solvent were removed. The residue, when subjected to distillation at reduced pressure, afforded 505 grams (92.2 percent yield) of meta-aminophenylmethylcarbinol boiling at 115° C. (0.5 mm. Hg).

Example VI

A flask equipped with a stirrer was charged with 1500 grams of crude meta-nitroacetophenone and 1000 cc. of a 5 percent sodium carbonate solution. The mixture was heated until the meta-nitroacetophenone was completely melted; thereupon the mixture was allowed to cool and the meta-nitroacetophenone, thus washed, was filtered and recovered.

A hydrogenation bomb was charged with 671 grams of the washed meta-nitroacetophenone and made up to 1500 cc. with dioxane and 40 grams of Raney nickel. Hydrogen was then introduced into the bomb at a pressure of 2000 pounds per square inch. Hydrogen was absorbed at a temperature of 25° C.; the temperature was raised to 120° C. and maintained at that temperature until the hydrogen absorption was complete. The reaction mixture was removed from the bomb and filtered free of catalyst and solvent-stripped. The residue, when subjected to distillation at reduced pressure, afforded 532 grams (95.5 percent yield) of meta-aminophenylmethylcarbinol boiling at 130° C. (2.5 mm. Hg).

Example VII

A hydrogenation bomb was charged with 500 grams of meta-nitroacetophenone, washed as in Example VI, 1100 cc. of isopropyl alcohol, and 20 grams of Raney nickel. Hydrogen was then introduced into the bomb at 150 pounds per square inch. The temperature was slowly raised to 120° C. then to 135° C. and maintained at that temperature until the hydrogen absorption was complete. The reaction mixture was removed from the bomb, filtered free of catalyst, and solvent-stripped. The residue, when subjected to distillation at reduced pressure, afforded 363 grams (87.5 percent yield) of meta-aminophenylmethylcarbinol boiling at 125° C. (2 mm. Hg).

What is claimed is:

1. In a process for the hydrogenation of crude meta-nitroacetophenone, obtained by the nitration of acetophenone and containing a water-insoluble acid, in a hydrogenation zone to produce a compound selected from the group consisting of meta-aminoacetophenone and meta-aminophenylmethylcarbinol under hydrogenating conditions in the presence of a hydrogenation catalyst, the improvement which comprises washing the crude meta-nitroacetophenone with a member selected from the group consisting of an aqueous alkali metal carbonate solution and an aqueous alkali metal bicarbonate solution and thereafter introducing the meta-nitroacetophenone, thus washed, into the hydrogenation zone for hydrogenation.

2. In a process for the hydrogenation of crude meta-nitroacetophenone, obtained by the nitration of acetophenone and containing a water-insoluble acid, in a hydrogenation zone to produce a compound selected from the group consisting of meta-aminoacetophenone and meta-aminophenylmethylcarbinol under hydrogenating conditions in the presence of a hydrogenation catalyst, the improvement which comprises washing the crude meta-nitroacetophenone with an aqueous alkali metal carbonate solution and thereafter introducing it into the hydrogenation zone for hydrogenation.

3. In a process for the hydrogenation of crude meta-nitroacetophenone, obtained by the nitration of acetophenone and containing a water-insoluble acid, in a hydrogenation zone to produce a compound selected from the group consisting of meta-aminoacetophenone and meta-aminophenylmethylcarbinol under hydrogenating conditions in the presence of a hydrogenation catalyst, the improvement which comprises washing the crude meta-nitroacetophenone with a sodium carbonate solution and thereafter introducing it into the hydrogenation zone for hydrogenation.

4. In a process for the hydrogenation of crude meta-nitroacetophenone, obtained by the nitration of acetophenone and containing a water-insoluble acid, in a hydrogenation zone to produce meta-aminoacetophenone under hydrogenating conditions at a temperature in the range of 25° C. to 100° C., in the presence of a hydrogenation catalyst, the improvement which comprises washing the crude meta-nitroacetophenone with an aqueous alkali metal carbonate solution and thereafter introducing it into the hydrogenation zone for hydrogenation.

5. In a process for the hydrogenation of crude meta-nitroacetophenone, obtained by the nitration of acetophenone and containing a water-insoluble acid, in a hydrogenation zone to produce meta-aminoaceptophenone under hydrogenating conditions at a temperature in the range of 25° C. to 100° C., in the presence of a hydrogenation catalyst, the improvement which comprises washing the crude meta-nitroaceptophenone with an aqueous sodium carbonate solution and thereafter introducing it into the hydrogenation zone for hydrogenation.

6. In a process for the hydrogenation of crude meta-nitroacetophenone, obtained by the nitration of acetophenone and containing a water-insoluble acid, in a hydrogenation zone to produce meta-aminophenylmethylcarbinol under hydrogenating conditions at a temperature of 80° C. to 180° C. in the presence of a hydrogenation catalyst, the improvement which comprises washing the crude meta-nitroacetophenone with an aqueous alkali metal carbonate solution and thereafter introducing it into the hydrogenation zone for hydrogenation.

7. In a process for the hydrogenation of crude meta-nitroacetophenone, obtained by the nitration of acetophenone and containing a water-insoluble acid, in a hydrogenation zone to produce meta-aminophenylmethylcarbinol under hydrogenating conditions at a temperature of 80° C. to 180° C. in the presence of a hydrogenation catalyst, the improvement which comprises washing the crude meta-nitroacetophenone with an aqueous sodium carbonate solution and thereafter introducing it into the hydrogenation zone for hydrogenation.

8. In a process for the hydrogenation of crude meta-nitroacetophenone, obtained by the nitration of acetophenone and containing a water-insoluble acid, in a hydrogenation zone to produce meta-aminoacetophenone under hydrogenating conditions at a temperature in the range of 25° C. to 100° C. in the presence of a hydrogenation catalyst, the improvement which comprises washing the crude meta-nitroacetophenone with an aqueous sodium bicarbonate solution and thereafter introducing it into the hydrogenation zone for hydrogenation.

9. In a process for the hydrogenation of crude meta-nitroacetophenone, obtained by the nitration of acetophenone and containing a water-insoluble acid, in a hydrogenation zone to produce meta-aminophenylmethylcarbinol under hydrogenating conditions at a temperature of 80° C. to 180° C. in the presence of a hydrogenation catalyst, the improvement which comprises washing the crude meta-nitroacetophenone with an aqueous sodium bicarbonate solution and thereafter introducing it into the hydrogenation zone for hydrogenation.

10. A process for the hydrogenation of crude meta-nitroacetophenone, obtained by the nitration of acetophenone and containing a water-insoluble acid, including in combination the steps of washing the crude meta-nitroacetophenone with an aqueous alkali metal carbonate solution and thereafter reacting the thus washed meta-nitroacetophenone with hydrogen in the presence of a hydrogenation catalyst at an elevated temperature and pressure.

References Cited in the file of this patent
UNITED STATES PATENTS 2,680,136    Lomartire    June 1, 1954
2,683,745    Emerson et al.    July 13, 1954